(12) United States Patent
Liao et al.

(10) Patent No.: US 6,196,240 B1
(45) Date of Patent: Mar. 6, 2001

(54) EQUIPMENT FOR CONVEYANCE AND TREATMENT OF GARBAGE IN HIGH BUILDING

(76) Inventors: Howard Liao; Hen Liao; Gun Je Liao; Han-Pin Liu; Chih Hsiung Kuo, all of No. 114, Lukuang Erh Tsun Kuei Shan Hsiang Tao Yuan Hsien (TW)

( * ) Notice: Subject to any disclaimer, the term of this patent is extended or adjusted under 35 U.S.C. 154(b) by 0 days.

(21) Appl. No.: 09/249,083

(22) Filed: Feb. 12, 1999

(51) Int. Cl.[7] ....................................................... B08B 3/02
(52) U.S. Cl. ................. 134/153; 134/166 R; 134/169 R; 134/201; 134/144
(58) Field of Search ............................ 134/166 R, 169 R, 134/168 R, 166 C, 169 C, 168 C, 201, 115 G, 153, 147, 115 R, 144; 414/21

(56) References Cited

U.S. PATENT DOCUMENTS

| 3,767,074 | * | 10/1973 | Sandefer . |
| 3,772,855 | * | 11/1973 | Domnitch . |
| 4,071,919 | * | 2/1978 | Fields et al. . |
| 4,108,498 | * | 8/1978 | Bensten . |
| 5,000,641 | * | 3/1991 | Kikuchi et al. . |
| 5,193,469 | * | 3/1993 | Mcrae . |
| 5,218,900 | * | 6/1993 | Elliot . |
| 5,377,706 | * | 1/1995 | Huang . |
| 5,762,083 | * | 6/1998 | Bate . |
| 5,941,258 | * | 8/1999 | Flenniken et al. . |
| 5,997,060 | * | 12/1999 | Sperduto . |

FOREIGN PATENT DOCUMENTS

| 698103 | * | 10/1953 | (UA) | ................................ | 134/166 R |
| 2025564 | * | 1/1980 | (UA) | ................................ | 134/167 R |

* cited by examiner

Primary Examiner—Frankie L. Stinson
(74) Attorney, Agent, or Firm—Bacon & Thomas, PLLC

(57) ABSTRACT

An equipment for conveyance and treatment of garbage in a high building comprises a conveyer, a guide track, gathering barrels, and a cleaning mechanism. The conveyer further comprises a driving motor, a conveyer belt, a driving gear wheel, and a driven gear wheel, wherein the driving motor is to drive the conveyer belt to revolve via the driving gear wheel and the driven gear wheel. A guide track is covered with the conveyer belt for stable revolution, and the gathering barrel attached to the conveyer belt externally is provided with a reception opening for garbage collection of each story. A bracket and cantilevers are supplied to the gathering barrel to keep the same upright when circulating. The gathered garbage is conveyed to base story of a building and ejected through outlet at bottom of the gathering barrel. The used gathering barrel will be cleaned by the cleaning mechanism for immediate subsequent use.

9 Claims, 7 Drawing Sheets

EQUIPMENT FOR CONVEYANCE AND TREATMENT OF GARBAGE IN HIGH BUILDING

BACKGROUND OF THE INVENTION

This invention relates to an equipment for conveyance and treatment of garbage in a high building, particularly to an equipment that facilitates dumping garbage for each story instead of carrying the same down to the first floor individually for time and trouble saving, as well as tidy environment keeping.

A resident in a high building usually has to carry garbage down to the first floor for disposal that is not only laborious and troublesome but also disgusting in the case of leaking to contaminate environment in carrying process to degrade living quality.

SUMMARY OF THE INVENTION

In view of above demand, this invention is proposed to provide an equipment for conveyance and treatment of garbage in a high building to save trouble and to further improve living quality of resided people to substantiate environmental protection of a community.

The main object of this invention is to provide an equipment for conveyance and treatment of garbage in a high building by arranging a disposal entrance in each story and gathering barrels moving between stories for conveying dumped garbage. The on-story treatment and automatic conveyance of garbage is especially convenient for people residing in a 30-story down building.

Another object of this invention is to provide an equipment for conveyance and treatment of garbage in a high building by concentration treatment without contaminating each story in the building, and the gathering barrels can be cleaned and sterilized with a cleaning mechanism to keep tidiness of the environment.

A further object of this invention is to provide an equipment for conveyance and treatment of garbage automatically in a high building with least manpower.

One more object of this invention is to provide an equipment for conveyance and treatment of garbage in a high building that can be applied also to clean and transport any work waste in addition to household garbage.

A furthermore object of this invention is to provide an equipment for conveyance and treatment of garbage in a high building cooperative with building management by disposing a collection barrel at each story and setting a garbage gathering and conveying time period every day, 2–4 hrs for example, to facilitate an aggregate treatment that can save time, power consumption, and trouble of residents.

A final object of this invention is to provide an equipment for conveyance and treatment of garbage in a high building by arranging a card reading machine at each story beside garbage entrance to avoid accident of children, and by way of rubbish assortment and retrieval of resource, a profit feedback to the residents is possible.

BRIEF DESCRIPTION OF THE DRAWINGS

For better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
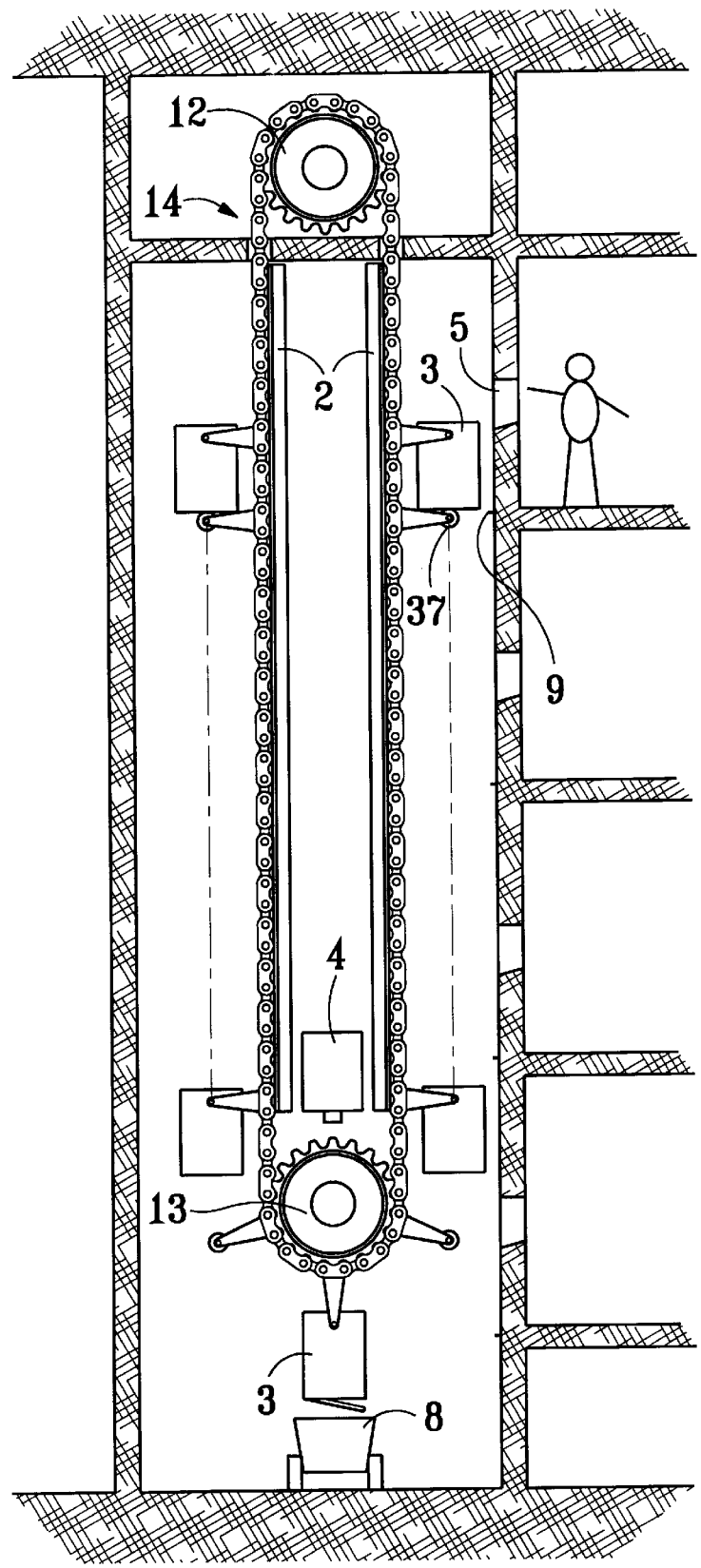
FIG. 1 is an embodiment schematic view of this invention.
Figure 2:
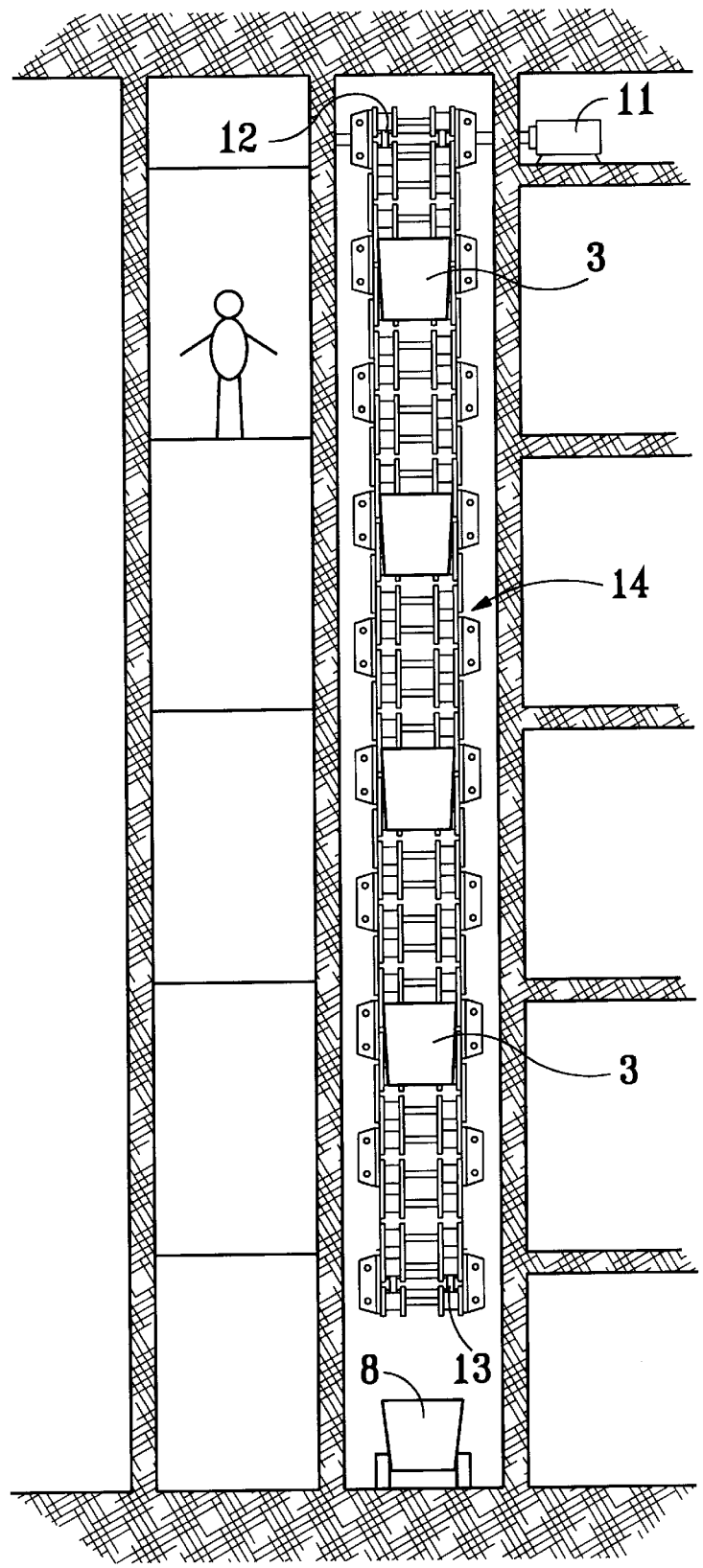
FIG. 2 is a lateral schematic view of the embodiment of this invention.
Figure 4:
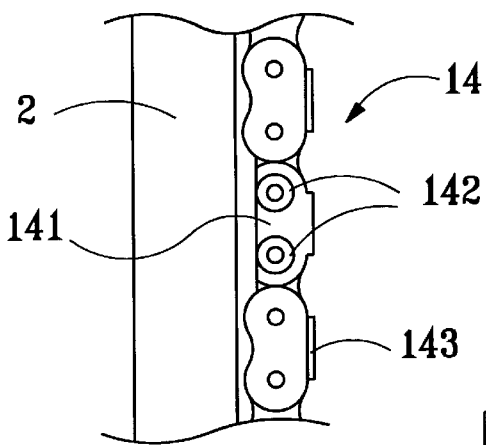
FIG. 4 is a structural schematic view showing a chain belt and a track of this invention.
Figure 5:
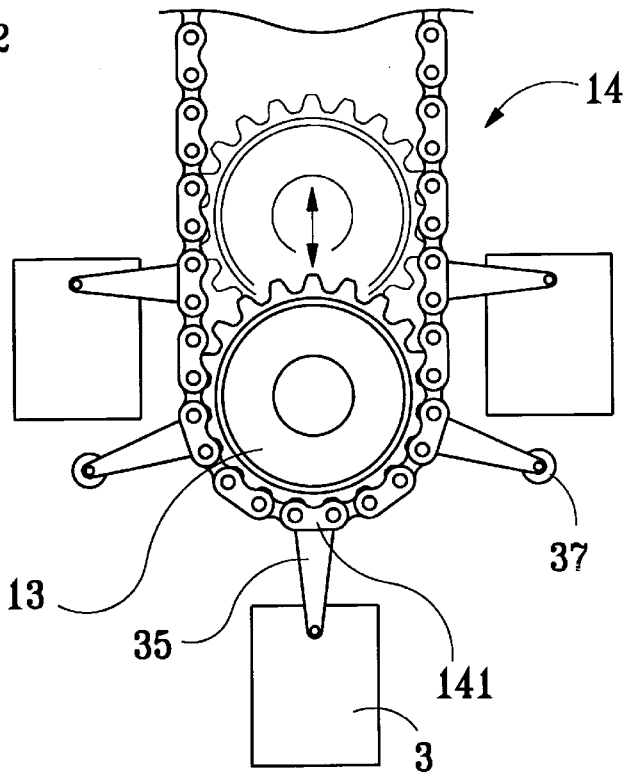
FIG. 5 is a schematic view showing adjustment action of a driven gear wheel of this invention.
Figure 3:
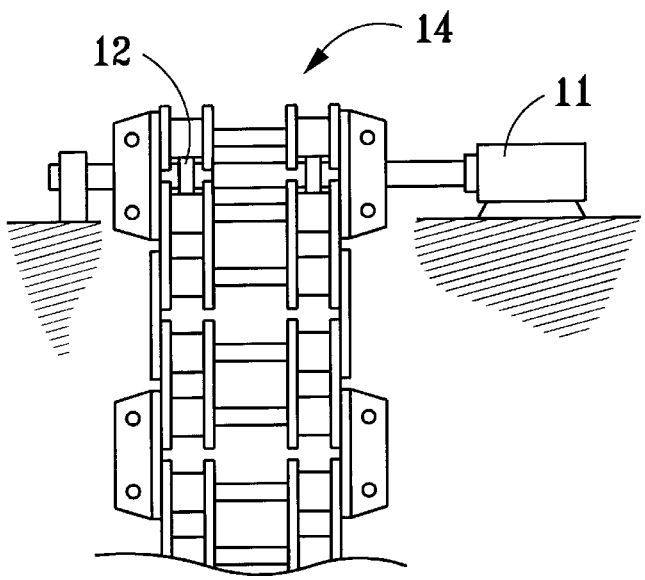
FIG. 3 is a structural schematic view showing a driving motor and a driving gear wheel of this invention.

As shown in FIG. 1 and 2, an equipment for conveyance and treatment of garbage in a high building of this invention comprises a conveyer 1, a guide track 2, gathering barrels 3, and a cleaning mechanism 4. The conveyer 1 is provided with a driving motor 11, which can rotate in forward or reverse direction, is located at somewhere proper on top of a building. A shaft 111 of the driving motor is penetrating a driving gear wheel 12 and fixed therein (as shown in FIG. 3). A driven gear wheel 13 is located at base story of the building somewhere corresponding to the driving gear wheel 12, and a conveyer belt 14 is geared onto the driving gear wheel 12 and the driven gear wheel 13 externally. The conveyer belt 14 is mainly composed of a chain belt 141 with internal rollers 142 and external fixing strips 143 enclosed. The driven gear wheel 13 and the conveyer belt 14 are driven by the driving gear wheel 12 (as shown in FIG. 4), and the driven gear wheel 13 is movable up and down for adjusting length, stress, and height from floor of the conveyer belt 14 for better operational conditions (as shown in FIG. 5).

The guide track 2 is laid on inner face of roller of the conveyer belt 14 with a narrower width to contact with rollers for keeping the conveyer belt 14 to revolve without offset, so that it can exactly pass through a garbage dumping entrance 5 at each story of the building (as shown in FIG. 1).

Figure 6:
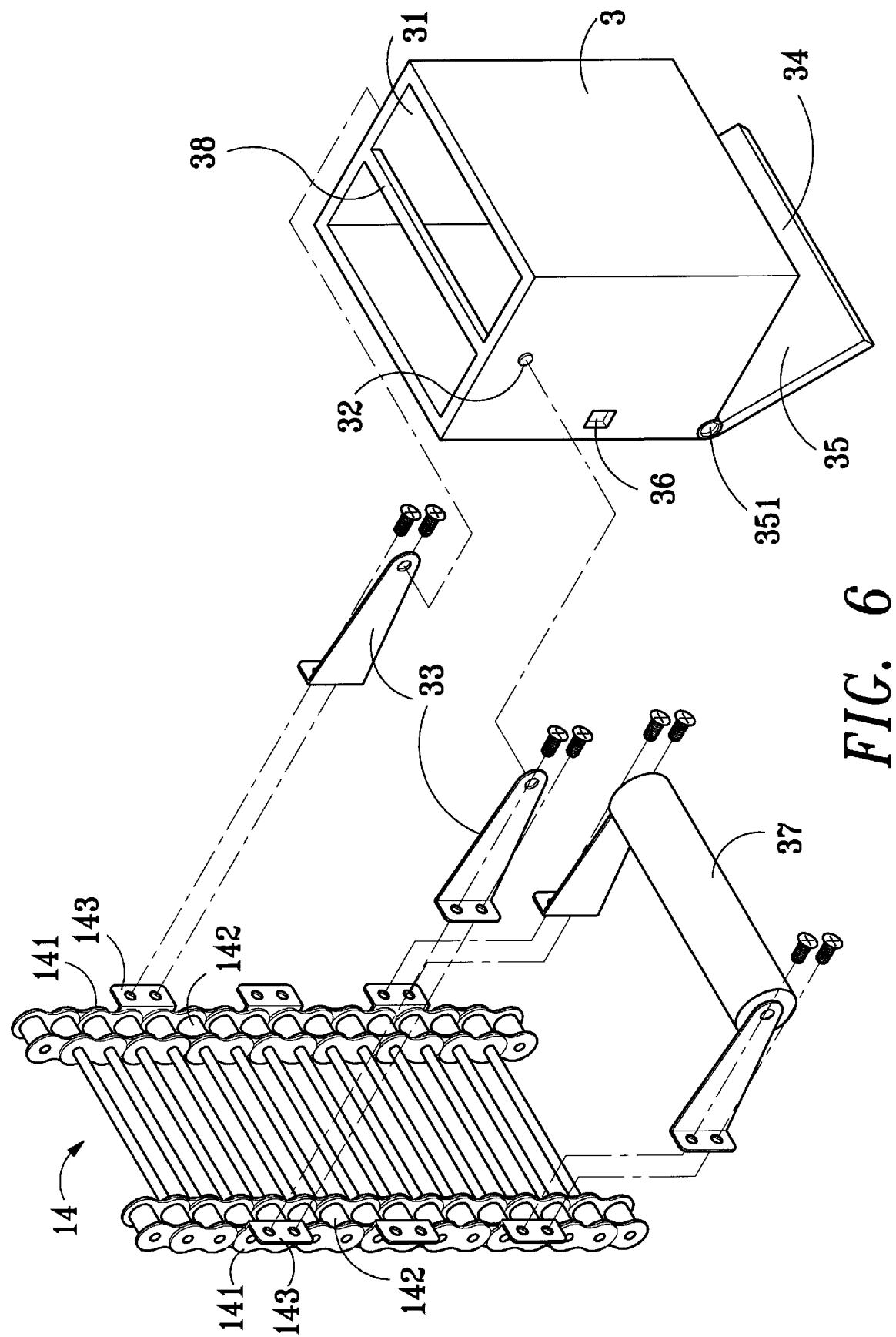
FIG. 6 is an exploded schematic view showing disposition example of a gathering barrel of this invention.
Figure 7:
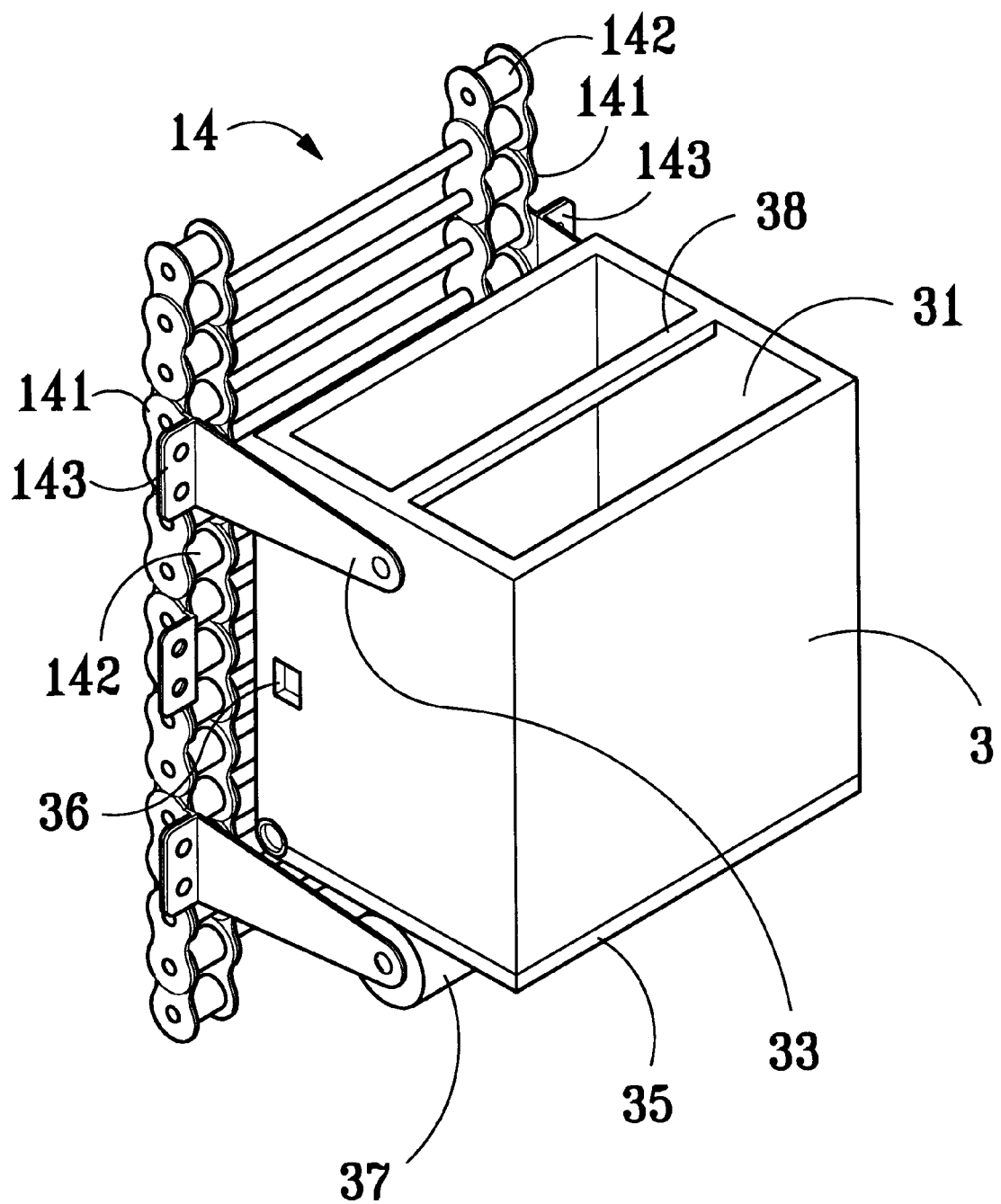
FIG. 7 is a schematic view showing a disposed gathering barrel of this invention.
Figure 8:
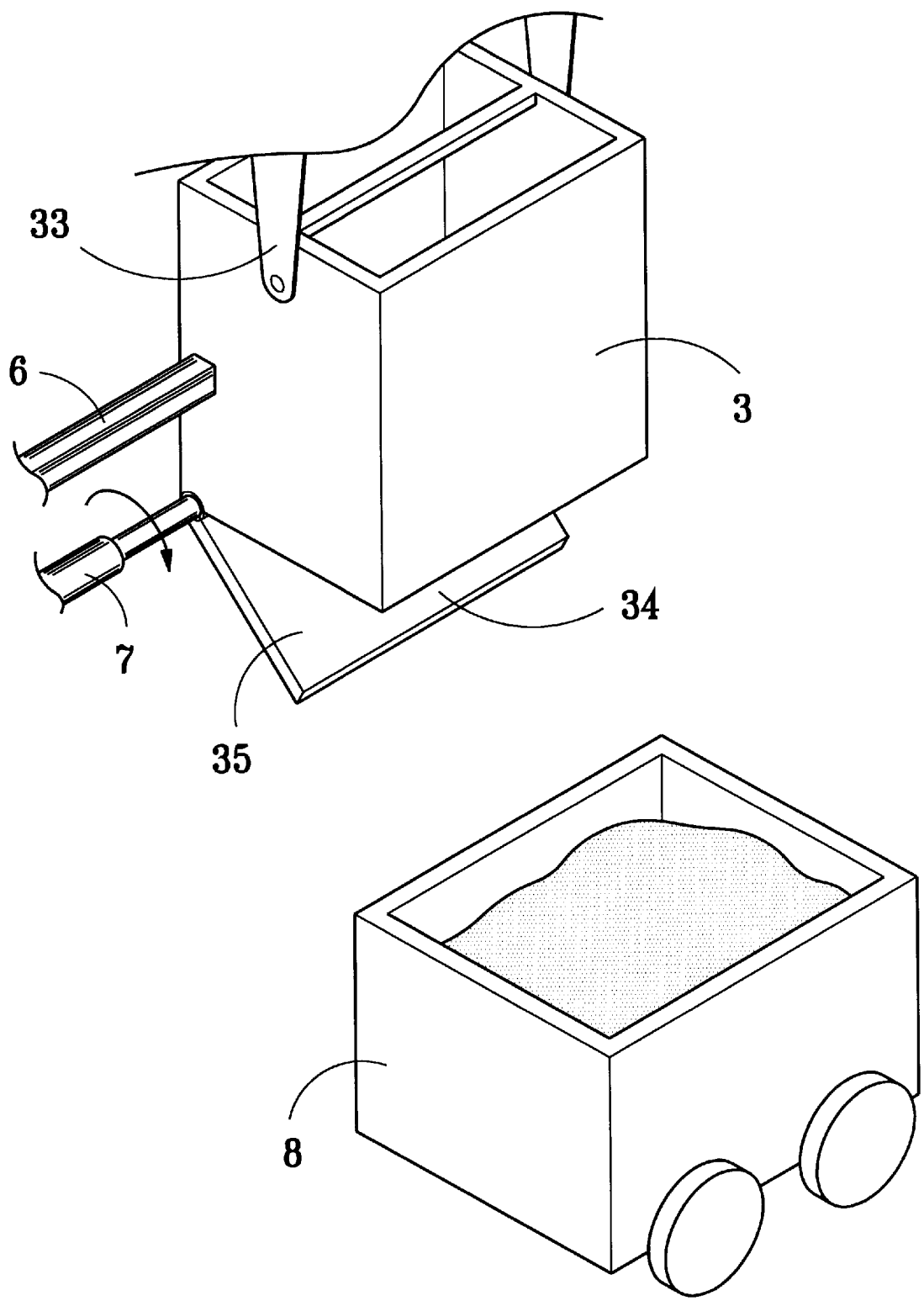
FIG. 8 is a schematic view showing a gathering barrel of this invention under operation.

As shown in FIG. 6 and 7, at least one gathering barrel 3 disposed on outer-lateral side of the conveyer belt 14 for conveying garbage or work waste, wherein a reception opening 31 is formed on top of the gathering barrel 3 to serve as a dumping entrance of garbage. Each of two lateral faces of the gathering barrel 3 is fixed with a rivet 32 at upper position respectively, which is collared with a cantilever 33 extending backwards to be fixed at the fixing strips 143 of the conveyer belt 14. The gathering barrels 3 are thus moving with the conveyer belt 14 from story to story in an upright posture without worry of being skewed owing to the revolvable cantilever 33. A dumping outlet 34 prepared at bottom face of the gathering barrel 3 for dumping out the garbage is sealed with a cover 35 when conveying, and in a pivot at rear end of the movable cover 35, an open/close hole 351 is arranged for opening or closing the movable cover 35 by inserting a tool in the open/close hole 351. In addition, on each lateral face of the gathering barrel 3, a support hole 36 is preserved at proper position serving as a handgrip for holding the gathering barrel 3 when dumping. A bracket 37 fixed at the conveyer belt 14 is further provided underneath the gathering barrel 3 to hold the same for stability enhancement when moving; and a reinforced beam 38 can be added to increase loading ability of the gathering barrel 3.

Figure 9:
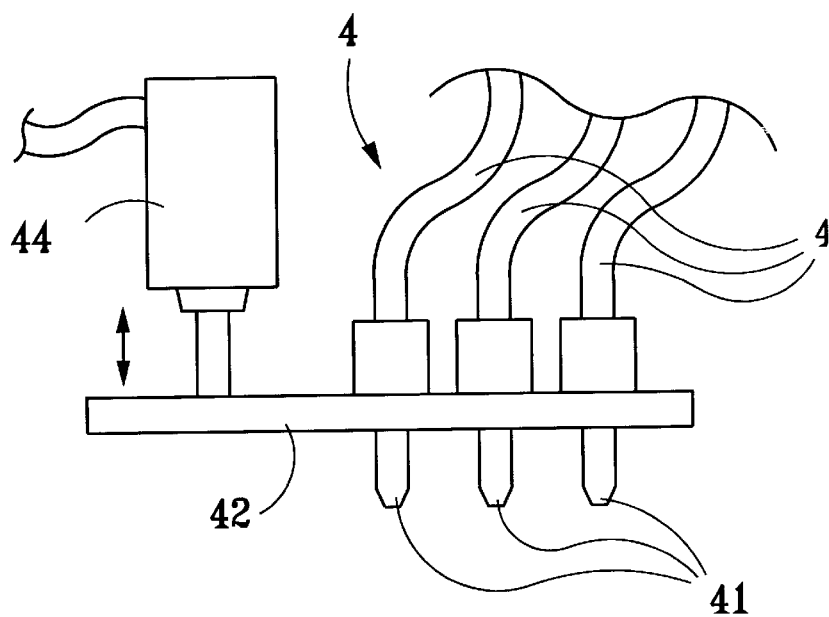
FIG. 9 is a schematic view showing a cleaning mechanism of this invention.
Figure 9:
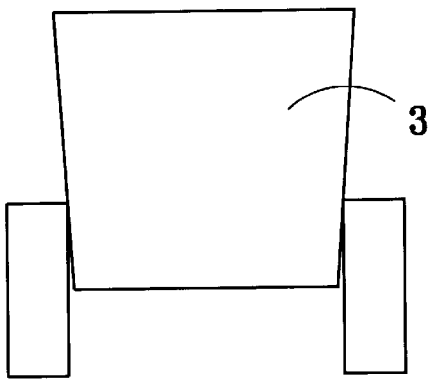

As shown in FIG. 9, the cleaning mechanism 4 located at base story of a building comprises at least a downward nozzle 41 disposed in a terminal plate 42. Rear end of the nozzle 41 connects to a cleaning duct 43 which can be a water hose, air duct, or steam pipe, or concurrently disposed to provide different cleaning ways. In the case of a steam pipe, the cleaning mechanism will provide a mixture of steam and detergent to spray in the gathering barrel 3 for cleaning, disinfecting, and sterilizing at one time, and the sprayed mixture will evaporate soon enough for a gathering barrel 3 to resume its job immediately. The other end of the terminal plate 42 connects to a lifting equipment 44 of hydraulic of pneumatic type adopted according to weight of load, which is used to adjust height of the nozzle for easy cleaning of the gathering barrels 3.

Please refer to FIG. 1 and 2 again. We suggest installing the equipment of this invention nearby an elevator, so that a resident can dump or dispose garbage at ease without wasting any extra time. When applying the equipment for conveyance and treatment of garbage in a high building of this invention, the driving motor 11 has to be switched "ON" at first, then the conveyer belt 14 is driven to revolve by the driving gear wheel 12 and the driven gear wheel 13 to carry the gathering barrels 3 to each story respectively. After a user has dumped garbage or workwaste into the gathering barrel 3 through dumping entrance 5, the conveyer belt 14 will be started again to revolve and carry the gathering barrel 3 down to base story of the building. Two pushing rods 6 are used to prop at the support holes 36 to stabilize the gathering barrel 3 from swinging, and a spanner 7 is employed to open the cover 35 for dumping the garbage into a dumpcart 8 for subsequent treatment; then, the cleaning mechanism 4 is moved down for the nozzle 41 to clean and sterilize the gathering barrel 3.

The above work process can be completed by respective control of conveyer 1, gathering barrel 3, and cleaning mechanism 4, or by linking devices on-line for automatic operation that shall require a sensor 9 at each story to make sure if the gathering barrels 3 stop at right positions.

Figure 10:
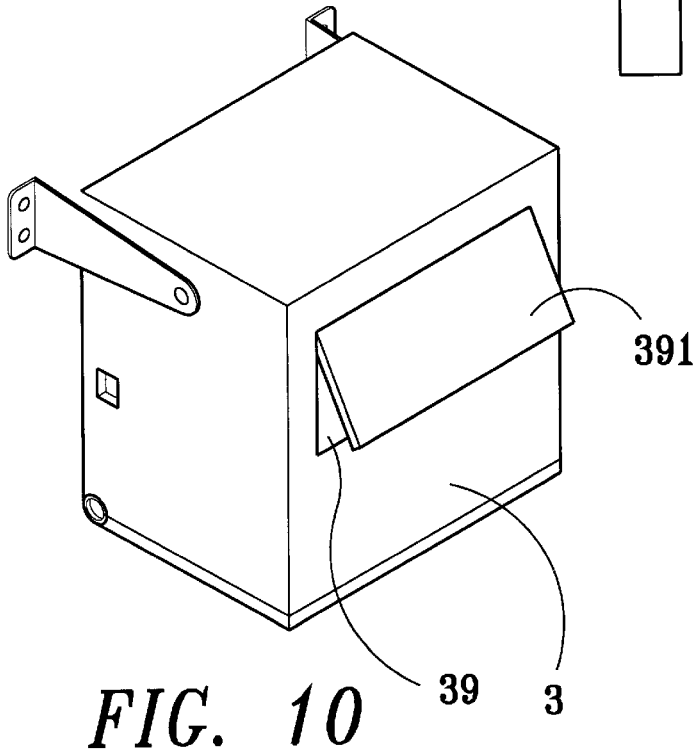
FIG. 10 is an altered-structural schematic view of gathering barrel of this invention.

As shown in FIG. 10, an reception opening 39 with a cover 391 can be arranged at front face of the gathering barrel 3 as an alternative.

In the above described, at least one preferred embodiment has been elucidated with reference to relating drawings annexed, it is apparent that numerous variations or modifications may be made without departing from the true spirit and scope thereof, as set forth in the following claims.

What is claimed is:

1. An equipment for conveyance and treatment of garbage in a high building, comprising:

a conveyer further comprising a driving motor, a conveyer belt, a driving gear wheel, and a driven gear wheel, wherein said driving motor located on top of a building can rotate in forward and reverse directions, and shaft thereof is penetrating and fixed in said driving gear wheel; said driven gear wheel is located at base story in the same building; said conveyer belt is geared onto said driving gear wheel and said driven gear wheel to enable said driving motor to drive said conveyer belt and said driven gear wheel;

a guide track with a narrower width laid against inner face of conveyer rollers to guide said conveyer moving without offset;

at least one gathering barrel installed at said conveyer belt externally, wherein a reception opening is formed in top face of said gathering barrel; a rivet is fixed in each of two lateral faces at upper portion respectively, and said rivet is collared with a cantilever extending backwards to be fixed at said conveyer belt; a dumping outlet with a movable cover is provided to said gathering barrel at bottom face for opening and sealing purpose, and an open/close hole is formed in a pivot at rear end of said movable cover; and a bracket placed underneath said gathering barrel has its tail end been fixed at said conveyer belt and front end supported said gathering barrel;

a cleaning mechanism located at base story containing a downward oriented nozzle, wherein said nozzle is disposed in a terminal plate, and rear end of said nozzle is connected to at least one cleaning duct for providing detergent; the other end of said terminal plate is coupled to a movable equipment for adjusting height of said nozzle.

2. The equipment for conveyance and treatment of garbage in a high building of claim 1, wherein said driven gear wheel can be moved up or down for adjusting length, stress, and working height of said conveyer belt.

3. The equipment for conveyance and treatment of garbage in a high building of claim 1, wherein a chain is the main body of said conveyer belt; said chain comprises a plurality of rollers and fixing strips; in virtue of contact of said rollers to said guide track, said conveyer belt can be stabilized when revolving; said fixing strips are used to lock said cantilevers and/or said brackets.

4. The equipment for conveyance and treatment of garbage in a high building of claim 1, wherein a support hole is formed in each lateral face of said gathering barrel, and a push rod may be inserted in said support hole to stabilize said gathering barrel to facilitate garbage cleaning.

5. The equipment for conveyance and treatment of garbage in a high building of claim 1, wherein a spanner can be put in said open/close hole to open or close said movable cover.

6. The equipment for conveyance and treatment of garbage in a high building of claim 1, wherein each face of said gathering barrel can be reinforced with an extra support beam to increase strength.

7. The equipment for conveyance and treatment of garbage in a high building of claim 1, wherein said reception opening of said gathering barrel can be provided with a sanitary cover for raising environmental quality.

8. The equipment for conveyance and treatment of garbage in a high building of claim 1, wherein said cleaning duct can be a water pipe, an air duct, or a steam pipe.

9. The equipment for conveyance and treatment of garbage in a high building of claim 1, wherein each story of a building may be equipped with a sensing device to detect and control said gathering barrels to stay at due positions.

* * * * *